United States Patent
Kim et al.

(10) Patent No.: US 12,372,689 B2
(45) Date of Patent: Jul. 29, 2025

(54) POLARIZER PROTECTIVE FILM, POLARIZATION PLATE COMPRISING SAME, AND OPTICAL DISPLAY APPARATUS COMPRISING SAME

(71) Applicant: Samsung SDI Co., Ltd., Yongin-si (KR)

(72) Inventors: Bong Choon Kim, Suwon-si (KR); Jun Mo Koo, Suwon-si (KR); Jung Hun You, Suwon-si (KR); Sang Hum Lee, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 608 days.

(21) Appl. No.: 17/764,906

(22) PCT Filed: Oct. 27, 2020

(86) PCT No.: PCT/KR2020/014751
§ 371 (c)(1),
(2) Date: Mar. 29, 2022

(87) PCT Pub. No.: WO2021/091152
PCT Pub. Date: May 14, 2021

(65) Prior Publication Data
US 2022/0390650 A1 Dec. 8, 2022

(30) Foreign Application Priority Data

Nov. 6, 2019 (KR) .................... 10-2019-0140992

(51) Int. Cl.
*G02B 1/14* (2015.01)
*G02B 1/04* (2006.01)
*G02B 5/30* (2006.01)

(52) U.S. Cl.
CPC ............... *G02B 1/14* (2015.01); *G02B 1/04* (2013.01); *G02B 5/3033* (2013.01)

(58) Field of Classification Search
CPC ........... G02B 1/14; G02B 1/04; G02B 5/3033
(Continued)

(56) References Cited

U.S. PATENT DOCUMENTS

| | | |
|---|---|---|
| 5,528,400 A | 6/1996 | Arakawa |
| 2004/0223099 A1 | 11/2004 | Kotchick et al. |

(Continued)

FOREIGN PATENT DOCUMENTS

| | | |
|---|---|---|
| CN | 1784630 A | 6/2006 |
| CN | 1837932 A | 9/2006 |

(Continued)

OTHER PUBLICATIONS

KIPO Office action issued Sep. 20, 2022, in corresponding Korean Patent Application No. 10-2019-0140992, 5 pages.
(Continued)

*Primary Examiner* — Wyatt A Stoffa
*Assistant Examiner* — Grant A Gagnon
(74) *Attorney, Agent, or Firm* — Womble Bond Dickinson (US) LLP

(57) ABSTRACT

A protective film for polarizers, a polarizing plate including the same, and an optical display apparatus including the same. The polyester-based film is a polyester protective film, has a thickness of about 10 μm to about 50 μm and a refractive index difference (nx−ny) of about 0.01 or more (nx and ny being indexes of refraction of the protective film at a wavelength of about 550 nm in the slow axis direction and the fast axis direction of the protective film, respectively), and is a biaxially stretched film. The slow axis direction of the protective film is coincident with a transverse direction (TD) thereof and an angle of about 70° to (Continued)

about 90° is defined between an external optical axis of the protective film and a normal direction with respect to an in-plane direction of the protective film.

9 Claims, 4 Drawing Sheets

(58) Field of Classification Search
USPC ............................................................ 359/507
See application file for complete search history.

(56) References Cited

U.S. PATENT DOCUMENTS

| | | |
|---|---|---|
| 2006/0216436 A1 | 9/2006 | Obara et al. |
| 2013/0093982 A1 | 4/2013 | Kuroda et al. |
| 2013/0301129 A1 | 11/2013 | In et al. |
| 2016/0209568 A1 | 7/2016 | Shin et al. |
| 2018/0224702 A1 | 8/2018 | Kuroda et al. |
| 2020/0326587 A1 | 10/2020 | Heo et al. |
| 2020/0341316 A1 | 10/2020 | Kim et al. |

FOREIGN PATENT DOCUMENTS

| | | |
|---|---|---|
| CN | 103033984 A | 4/2013 |
| CN | 103389536 A | 11/2013 |
| CN | 105492936 A | 4/2016 |
| JP | 2003-025414 A | 1/2003 |
| KR | 10-2005-0118739 A | 12/2005 |
| KR | 10-2011-0014515 A | 2/2011 |
| KR | 10-2013-0035939 A | 4/2013 |
| KR | 10-2015-0027684 A | 3/2015 |
| KR | 10-2015-0034631 A | 4/2015 |
| KR | 10-1730856 B1 | 4/2017 |
| KR | 10-2019-0087619 A | 7/2019 |
| KR | 10-2019-0113635 A | 10/2019 |
| TW | 201942609 A | 11/2019 |

OTHER PUBLICATIONS

International Search Report of PCT/KR2020/014751, Feb. 18, 2021, 4 pp.

Chinese Office Action dated Feb. 1, 2024, issued in corresponding Chinese Patent Application No. 202080064378.1 (8 pages).

[Figure 1]
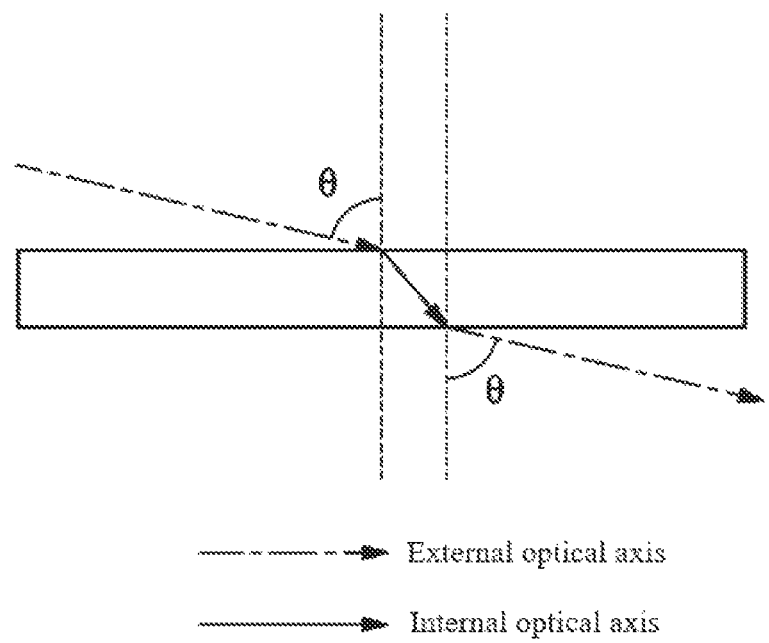

[Figure 2a]
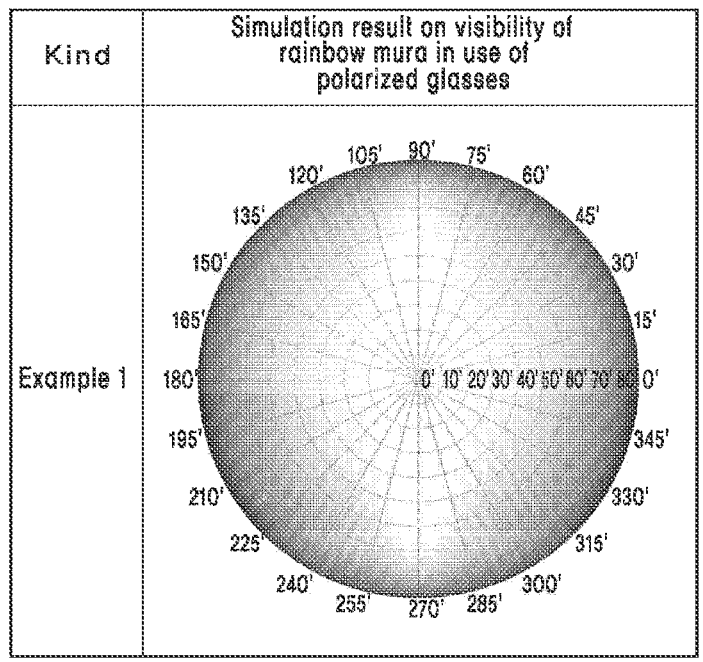
[Figure 2b]
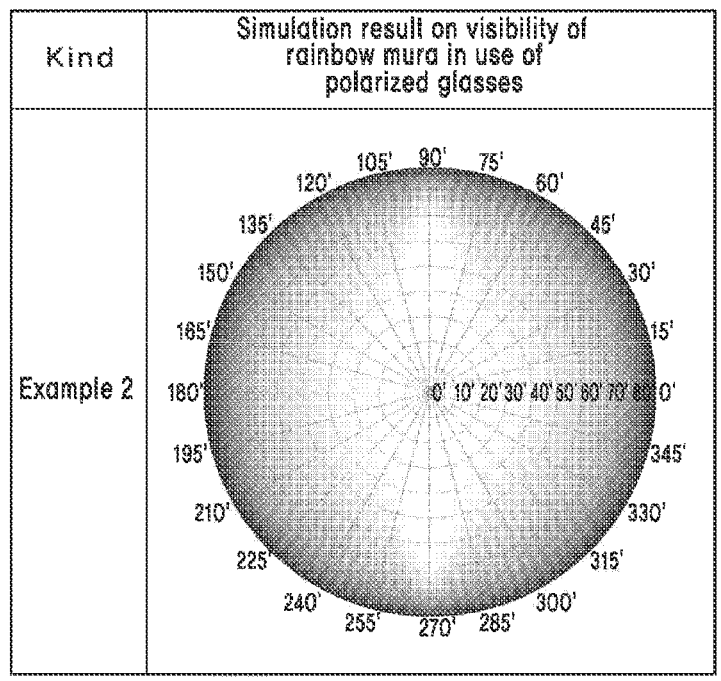

[Figure 2c]
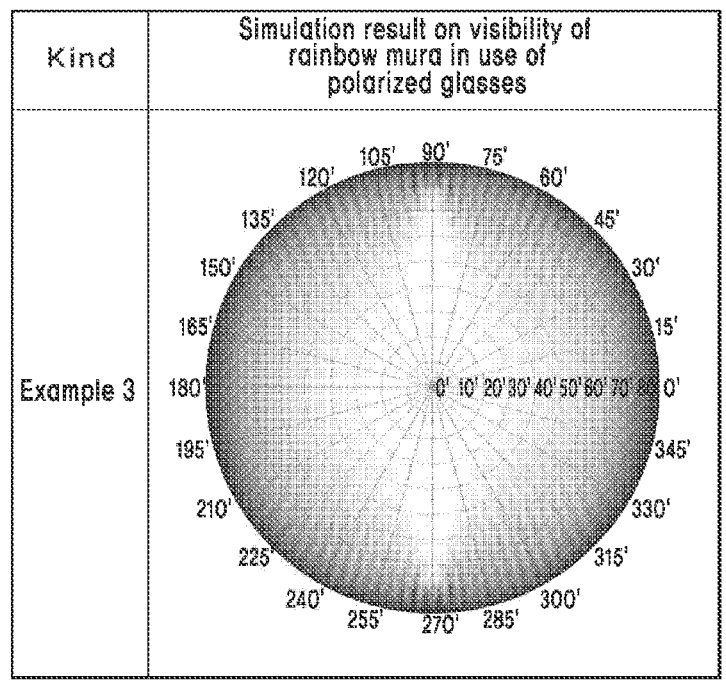
[Figure 2d]
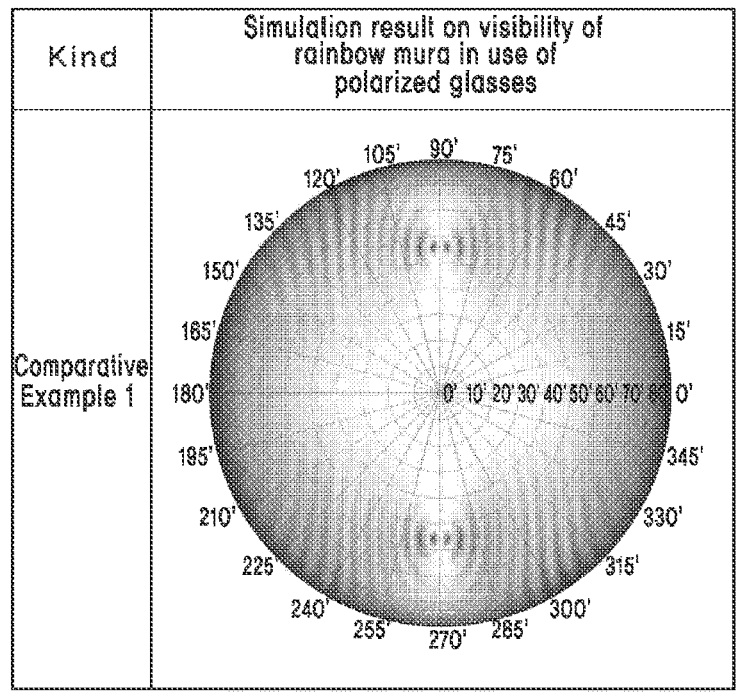

[Figure 2e]
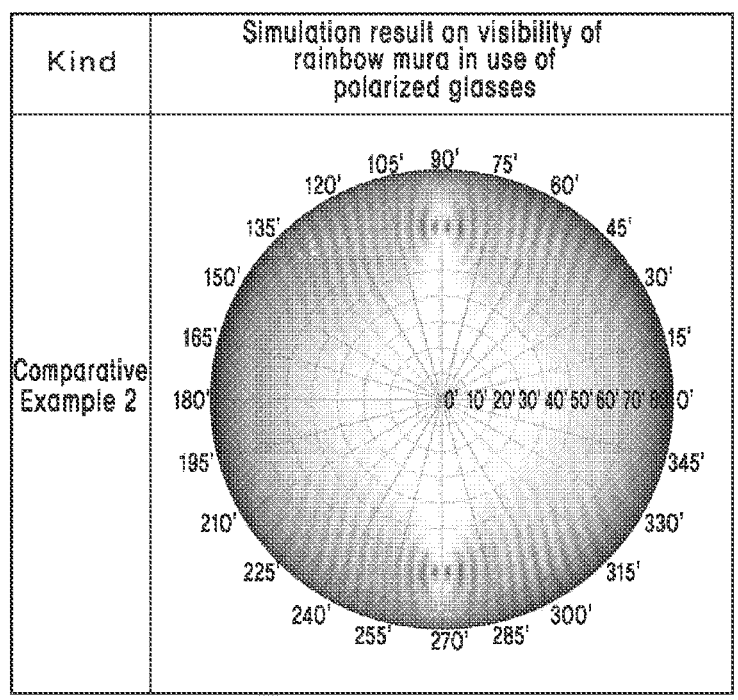

POLARIZER PROTECTIVE FILM, POLARIZATION PLATE COMPRISING SAME, AND OPTICAL DISPLAY APPARATUS COMPRISING SAME

CROSS-REFERENCE TO RELATED APPLICATIONS

This application is a U.S. National Phase Patent Application of International Application Number PCT/KR2020/014751, filed on Oct. 27, 2020, which claims priority of Korean Patent Application Number 10-2019-0140992, filed on Nov. 6, 2019, the entire content of each of which is incorporated herein by reference.

TECHNICAL FIELD

The present invention relates to a protective film for polarizers, a polarizing plate including the same, and an optical display apparatus including the same. More particularly, the present invention relates to a protective film for polarizers, which prevents rainbow mura from being visible in use of polarized sunglasses and has high productivity, a polarizing plate including the same, and an optical display apparatus including the same.

BACKGROUND ART

For visualization of a display pattern of a liquid crystal display, polarizing plates is are disposed on upper and lower surfaces of a liquid crystal panel in order to control an oscillation direction of light. The polarizing plate includes a polarizer and a protective film formed on at least one surface of the polarizer. The protective film may be a triacetylcellulose (TAC) film. The TAC film is more expensive than a typical polymer film. Instead of the TAC film, an inexpensive polyester-based polymer film including a polyethylene terephthalate (PET) film is used in the art.

The polyethylene terephthalate film has high birefringence to allow rainbow mura to be visible when used in the polarizing plate. In order to prevent the rainbow mura of a typical polyethylene terephthalate film from being visible, there has been suggested a method of increasing or removing in-plane retardation of the polyethylene terephthalate film or a method of applying a polarization releasing technique thereto.

Recently, with increasing opportunities for outdoor activities, such as hiking, golf, fishing, skiing, and driving, more people wear polarized sunglasses to remove glare while reducing eye fatigue. However, a typical polyethylene terephthalate film or a polyethylene terephthalate film having a high in-plane retardation of about 2,000 nm or more has a limit in improvement in visibility of rainbow mura when viewed through the polarized sunglasses.

The background technique of the present invention is disclosed in Korean Patent Laid-open Publication No. 10-2011-0014515 and the like.

DISCLOSURE

Technical Problem

It is one object of the present invention to provide a protective film for polarizers, which can prevent rainbow mura from being visible when an optical display apparatus is viewed through polarized sunglasses.

It is another object of the present invention to provide a protective film for polarizers, which has good quality by preventing rainbow mura from being visible through adjustment of an angle of an optical axis having no phase retardation.

Technical Solution

One aspect of the present invention relates to a protective film for polarizers.

1. The protective film for polarizers is a polyester protective film, has a thickness of about 10 μm to about 50 μm, a refractive index difference (nx−ny) of about 0.01 or more (nx and ny being indexes of refraction of the protective film at a wavelength of about 550 nm in a slow axis direction and a fast axis direction of the protective film, respectively), and is a biaxially stretched film, wherein the slow axis direction of the protective film is coincident with a transverse direction (TD) thereof and an angle of about 700 to about 900 is defined between an external optical axis of the protective film and a normal direction with respect to an in-plane direction of the protective film.

2. In 1, the protective film may have a fast axis tilted at an angle of about 60° to about 120° with respect to the TD of the protective film.

3. In 1 and 2, the protective film may have an in-plane retardation of about 2,000 nm to about 7,000 nm at a wavelength of about 550 nm.

4. In 1 to 3, the polyester protective film may include a film formed of at least one resin selected from among polyethylene terephthalate, polyethylene naphthalate, polybutylene terephthalate, and polybutylene naphthalate.

5. Another aspect of the present invention relates to a polarizing plate including: a polarizer; and the protective film for polarizers stacked on a light exit surface of the polarizer.

6. In 5, the polarizing plate may have a major length direction and a minor length direction, and an absorption axis of the polarizer may be coincident with the major length direction of the polarizing plate.

7. In 5 and 6, assuming that the absorption axis of the polarizer is placed at an angle of 0°, the protective film for polarizers may have a slow axis tilted at an angle of about 600 to about 1200 or at an angle of about −120° to about −60° thereto.

8. In 5 to 7, the polarizing plate may further include an optical film formed on a light incidence surface of the polarizer.

Advantageous Effects

A further aspect of the present invention relates to an optical display apparatus including the polarizing plate according to the present invention set forth above.

The present invention provides a protective film for polarizers, which can prevent rainbow mura from being visible when an optical display apparatus is viewed through polarized sunglasses.

The present invention provides a protective film for polarizers, which has good quality by preventing rainbow mura from being visible through adjustment of an angle of an optical axis having no phase retardation.

DESCRIPTION OF DRAWINGS

FIG. 1 is a view illustrating a relationship between an external optical axis and an internal optical axis.

FIG. 2 is a table illustrating simulation results of visibility with respect to rainbow mura of protective films of Examples and Comparative Examples in use of polarized glasses.

BEST MODE

Embodiments of the present invention will be described in detail with reference to the accompanying drawings such that the present invention can be easily implemented by those skilled in the art. It should be understood that the present invention may be embodied in different ways and is not limited to the following embodiments. In the drawings, portions irrelevant to the description will be omitted for clarity.

Herein, spatially relative terms such as "upper" and "lower" are defined with reference to the accompanying drawings. Thus, it will be understood that the term "upper surface" can be used interchangeably with the term "lower surface".

Herein, "in-plane retardation Re" is represented by Equation A:

$$Re = (nx - ny) \times d, \quad (A)$$

where nx and ny are indexes of refraction of a protective film for polarizers in the slow axis direction and the fast axis direction thereof at a wavelength of about 550 nm and d is the thickness of the protective film (unit: nm).

The inventor of the present invention completed the present invention based on the confirmation that, as a protective film for polarizers, a polyester protective film including all components described below can ensure improvement in productivity and quality by preventing rainbow mura from being visible merely through adjustment of an angle of an optical axis providing no phase retardation when an optical display apparatus is viewed through polarized sunglasses.

Hereinafter, a protective film for polarizers according to one embodiment of the present invention will be described with reference to FIG. 1.

The protective film for polarizers according to the present invention is a polyester protective film, has a thickness of about 10 μm to about 50 μm and a refractive index difference (nx−ny) of about 0.01 or more (nx and ny being indexes of refraction of the protective film at a wavelength of about 550 nm in the slow axis direction and the fast axis direction of the protective film, respectively), and is a biaxially stretched film, wherein the slow axis direction of the protective film is coincident with a transverse direction (TD) thereof and an angle of about 70° to about 90° is defined between an external optical axis of the protective film and a normal direction with respect to an in-plane direction of the protective film. With this structure, the protective film according to the present invention stacked on a light exit surface of a polarizer can prevent rainbow mura from being visible when viewed through polarized sunglasses, thereby improving productivity and quality.

The protective film for polarizers may have a thickness of about 10 μm to about 50 μm (for example, 10 μm, 20 μm, 30 μm, 40 μm, or 50 μm), preferably about 30 μm to about 50 μm. Within this thickness range, the protective film can realize a thin polarizing plate.

The protective film for polarizers may have a refractive index difference (nx−ny) of about 0.01 or more (nx and ny being the indexes of refraction of the protective film at a wavelength of about 550 nm in the slow axis direction and the fast axis direction of the protective film, respectively). If the refractive index difference (nx−ny) is less than about 0.01, the protective film exhibits properties of an isotropic film and thus does not generate rainbow mura, thereby failing to provide advantageous effects of the present invention. Within the above range, the protective film can exhibit anisotropic refraction properties and thus has better mechanical strength than the isotropic films while reducing moisture permeability. Preferably, the refractive index difference (nx−ny) is in the range of about 0.01 to about 0.2 (for example, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2).

The protective film for polarizers may be a biaxially stretched film and may have a slow axis coincident with the TD thereof. As described above, the protective film for polarizers may be fabricated through biaxial stretching in the MD and the TD such that the slow axis of the protective film is placed in the TD thereof by adjusting an MD stretching ratio, a TD stretching ratio, a ratio of the MD stretching ratio to the TD stretching ratio, or stretching temperature. If the slow axis of the protective film is placed in the MD thereof, the protective film according to the present invention cannot prevent rainbow mura from being visible when a liquid crystal display employing the same is viewed through polarized sunglasses at a main viewing angle (in a leftward/rightward direction).

In one embodiment, the protective film for polarizers may have a fast axis tilted at an angle of about 60° to about 1200 (for example, 600, 70°, 80°, 90°, 100°, 110°, or 120°), specifically about 70° to about 110°, with respect to the TD thereof. Within this range, the protective film can reduce a possibility of allowing rainbow mura to be visible when a liquid crystal display employing the same is viewed through polarized sunglasses at a main viewing angle (in the leftward/rightward directions).

The polyester protective film may include a film formed of at least one resin selected from among polyethylene terephthalate, polyethylene naphthalate, polybutylene terephthalate, and polybutylene naphthalate.

The protective film for polarizers may have an in-plane retardation of about 500 nm to about 10,000 nm (for example, 500 nm, 750 nm, 1,000 nm, 1,250 nm, 1,500 nm, 1,750 nm, 2,000 nm, 2,250 nm, 2,500 nm, 2,750 nm, 3,000 nm, 3,250 nm, 3,500 nm, 3,750 nm, 4,000 nm, 4,250 nm, 4,500 nm, 4,750 nm, 5,000 nm, 5,250 nm, 5,500 nm, 5,750 nm, 6,000 nm, 6,250 nm, 6,500 nm, 6,750 nm, 7,000 nm, 7,250 nm, 7,500 nm, 7,750 nm, 8,000 nm, 8,250 nm, 8,500 nm, 8,750 nm, 9,000 nm, 9,250 nm, 9,500 nm, 9,750 nm, or 10,000) at a wavelength of about 550 nm, preferably about 1,000 nm to about 8,000 nm, more preferably about 2,000 nm to about 7,000 nm, most preferably about 3,000 nm to about 7,000 nm. Within this range, the protective film can secure mechanical properties.

The inventors of the present invention confirmed that the protective film for polarizers allows rainbow mura to be visible, despite the structure described above. In particular, in a structure wherein the protective film for polarizers is stacked on a light exit surface of a polarizer and an absorption axis of the polarizer is disposed in the leftward/rightward of the polarizer, the inventors of the present invention confirmed that the protective film allows rainbow mura to be visible when a screen is viewed through polarized sunglasses.

Accordingly, the inventors of the present invention confirmed that the protective film for polarizers can solve problems relating to visibility of rainbow mura by adjusting an angle (θ) defined between an external optical axis of the protective film and a normal direction with respect to the in-plane direction of the protective film to be in the range of about 70° to about 900 (for example, 70°, 80°, or 90°). That is, the protective film for polarizers according to the present invention can prevent rainbow mura from being visible when a screen is viewed through polarized sunglasses, while ensuring thickness reduction and improvement in quality thereof.

First, referring to FIG. 1, the angle (θ) defined between the external optical axis (indicated by a dot-dashed line in FIG. 1) of the protective film and the normal direction (indicated by a downward dotted line in FIG. 1) with respect to the in-plane direction of the protective film will be described. FIG. 1 is a longitudinal cross-sectional view of a film, illustrating a relationship between the external optical axis (indicated by the dot-dashed line in FIG. 1) and an internal optical axis (indicated by a solid line in FIG. 1).

Referring to FIG. 1, the film has an internal optical axis and an external optical axis. The internal optical axis means an axis of the film which provides no phase retardation. The external optical axis refers to a path along which light having traveled along the internal optical axis of the film and emitted from the film travels. Accordingly, the external optical axis of the film means a path along which light is incident on an optical axis inside the film from an air layer or a path along which light exits from the optical axis inside the film to the air layer.

Referring to FIG. 1, the external optical axis is different from the slow axis. The external optical axis of the film corresponds to an optical axis thereof in which a velocity difference depending upon polarization direction, that is, phase retardation, does not occur while light travels, and the slow axis corresponds to a polarization direction in which light travels most slowly upon traveling in the normal direction with respect to a plane of the protective film. The protective film according to the present invention improves visibility of rainbow mura in use of polarized sunglasses through adjustment of the angle of the external optical axis corresponding to the optical axis which provides no phase retardation.

According to the present invention, the angle (θ) between the external optical axis of the protective film and the normal direction with respect to the in-plane direction of the protective film is adjusted within a particular range. That is, as shown in FIG. 1, the angle (θ) between the external optical axis of the protective film and the normal direction with respect to the in-plane direction of the protective film is adjusted in the range of about 70° to about 90°. Through this adjustment, the protective film can solve problems relating to visibility of rainbow mura in use of the polarized sunglasses. That is, the protective film for polarizing plates according to the present invention can completely remove rainbow mura in the rightward/leftward direction thereof corresponding to a main viewing angle direction. Preferably, the angle (θ) may be in the range of about 70° to less than about 90°, for example, in the range of about 800 to less than about 90°.

The protective film for polarizers may further include a functional coating layer on one or both surfaces thereof to provide additional functions to the protective film for polarizers or a polarizing plate including the same. The functional layer may include a primer layer, an antireflection layer, an anti-fingerprint layer, a hard-coating layer, an ultra-low reflection layer, and an antiglare layer, without being limited thereto.

Next, a method of manufacturing the protective film for polarizers will be described. The protective film for polarizers may be manufactured by the following method.

The protective film for polarizers may be manufactured by stretching a non-stretched film in the machine direction (MD) and the transverse direction (TD), in which the non-stretched film is manufactured through melt-extrusion of a composition for polyester films. Here, the film may be biaxially stretched in the MD and the TD by a simultaneous stretching method or a sequential biaxial stretching method. Preferably, the film is subjected to sequential biaxial stretching.

In the sequential biaxial stretching method, the non-stretched film is left at about 100° C. to about 180° C. (MD stretching temperature) and passed through a gap between rolls rotating at different speeds such that the film can be stretched to 1.5 times to about 3 times (MD stretching ratio) in the MD, followed by cooling to room temperature as soon as the film is stretched. Next, the stretched film is transferred to a tenter in which the stretched film is stretched to about 3 times to about 11 times (TD stretching ratio) at about 150° C. or more (TD stretching temperature), followed by relieving, thermal fixing, and winding. The wound film is subjected to aging at about 20° C. to about 45° C. and cut to a desired length. In the process of manufacturing the protective film, the MD stretching temperature, MD stretching ratio, TD stretching temperature, and TD stretching ratio may be adjusted to realize the protective film for polarizers according to the present invention.

In one embodiment, the MD stretching temperature is preferably in the range of greater than about 140° C. to 180° C., more preferably about 155° C. to 165° C., still more preferably about 155° C. to less than 160° C., particularly preferably about 155° C. to 159° C. In order to adjust the MD stretching temperature within this range, the temperature of the tenter is set within this range.

In one embodiment, the TD stretching temperature may be set to the same temperature as or a different temperature from the MD stretching temperature within the range of the MD stretching temperature.

Next, a polarizing plate according to one embodiment of the present invention will be described.

The polarizing plate includes: a polarizer, a first protective film for polarizers stacked on a light exit surface of the polarizer, and a second protective film for polarizers stacked on a light incidence surface of the polarizer, wherein the first protective film for polarizers includes the protective film for polarizers according to the present invention described above.

In one embodiment, the polarizing plate may be used as a viewer-side polarizing plate. The "viewer-side polarizing plate" refers to a polarizing plate disposed on a light exit surface of a liquid crystal panel in a display apparatus.

In one embodiment, the polarizing plate is configured to have a major length direction and a minor length direction, in which an absorption axis of the polarizer, that is, the MD of the polarizer, may be coincident with the major length direction of the polarizing plate.

In one embodiment, assuming that the absorption axis of the polarizer is placed at an angle of 0°, the first protective film for polarizers has a slow axis tilted at an angle of about 60° to about 120° (for example, 60°, 70°, 80°, 90°, 100°, 110°, or 120°), specifically about −120° to about −60° (for example, −120°, −110°, −100°, −90°, −80°, −70°, or −60°). Within this range, the first protective film can reduce visibility of rainbow mura in the main viewing angle direction.

The polarizer is formed of a polyvinyl alcohol film and may be manufactured by any method known in the art without limitation so long as the polyvinyl alcohol film is used. For example, the polarizer may be formed of a modified polyvinyl alcohol film, such as a partially formalized polyvinyl alcohol film, an acetoacetyl group-modified polyvinyl alcohol film, and the like. Specifically, the polarizer may be manufactured by dyeing a polyvinyl alcohol film with iodine or dichroic dyes, followed by stretching the dyed polyvinyl alcohol film in the MD (machine direction). Specifically, the polarizer is manufactured through swelling, dyeing, and stretching of the polyvinyl alcohol film. A method for each process is well known to those skilled in the art.

The polarizer may have a thickness of about 3 μm to about 30 μm, specifically about 15 μm to about 25 μm. Within this range, the polarizer can be used in a polarizing plate.

The second protective film for polarizers is formed on the light incidence surface of the polarizer to allow light emitted from the liquid crystal panel of the display apparatus to be emitted to the polarizer therethrough.

The second protective film for polarizers may be a film formed of an optically transparent resin. Specifically, the resin may include at least one selected from among cellulose resins such as triacetylcellulose and the like, cyclic polyolefin resins including cyclic olefin polymer (COP) and the like, polycarbonate resins, polyether sulfone resins, polysulfone resins, polyamide resins, polyimide resins, non-cyclic polyolefin resins, polyacrylate resins including poly(methyl acrylate) resins and the like, polyvinyl alcohol resins, polyvinyl chloride resins, and polyvinylidene chloride resins.

The second protective film for polarizers may have a thickness of about 20 μm to about 100 μm, preferably about 20 μm to about 60 μm. Within this range, the polarizer can be used in a polarizing plate.

The polarizing plate may have a polarization degree of about 99.99% or more, for example, about 99.99% to about 99.999%, and a transmittance of about 40% or more (as measured in the visible spectrum, for example, at a wavelength of 550 nm), for example, about 40% to about 80%. Within this range, the polarizing plate can prevent deterioration in properties thereof when mounted on a liquid crystal display.

Next, an optical display apparatus according to one embodiment of the present invention will be described.

The optical display apparatus according to the present invention includes the polarizing plate according to the embodiments of the invention. The optical display apparatus may include a light emitting display, such as an organic light emitting display and the like, and a liquid crystal display, without being limited thereto.

In one embodiment, the liquid crystal display may include a liquid crystal display panel, a first polarizing plate formed on an upper surface of the liquid crystal display panel, a backlight unit formed on a lower surface of the liquid crystal display panel, and a second polarizing plate formed on a lower surface of the liquid crystal display panel to be placed between the liquid crystal display panel and the backlight unit, in which the first polarizing plate may include the polarizing plate according to the embodiments of the present invention.

The liquid crystal display panel includes a liquid crystal panel including a liquid crystal cell layer encapsulated between a first substrate and a second substrate. In one embodiment, the first substrate may be a color filter (CF) substrate (upper substrate) and the second substrate may be a thin film transistor (TFT) substrate (lower substrate). The first substrate and the second substrate may be identical to or different from each other and may be glass substrates or plastic substrates. The plastic substrate may include plastic substrates such as PET (polyethylene terephthalate), PC (polycarbonate), PI (polyimide), PEN (polyethylene naphthalate), PES (polyether sulfone), PAR (polyarylate) and COC (cycloolefin copolymer) substrates, which can be used in a flexible display, without being limited thereto. The liquid crystal cell layer may include liquid crystals in a vertical alignment (VA) mode, an in-place switching (IPS) mode, a fringe field switching (FFS) mode, a twisted nematic (TN) mode, and the like.

The second polarizing plate may include a typical polarizing plate.

The backlight unit is generally used in a liquid crystal display and may include a light source, a light guide plate, a reflective plate, a diffusive plate, and the like.

Next, the present invention will be described in more detail with reference to examples. However, it should be noted that these examples are provided for illustration only and should not be construed in any way as limiting the invention.

Example 1

A polyvinyl alcohol film (VF-PS6000, thickness: 60 μm, Kuraray Co., Ltd., Japan) was stretched to 3 times an initial length thereof and dyed in an aqueous solution of iodine at 60° C., followed by stretching the dyed film to 2.5 times in an aqueous solution of boric acid at 40° C., thereby preparing a polarizer having a thickness of 22 μm.

A polyethylene terephthalate film was manufactured by biaxially stretching a non-stretched PET film obtained through melt-extrusion of a polyethylene terephthalate (PET) resin. Specifically, the polyethylene terephthalate film was manufactured by sequentially stretching the non-stretched PET film (thickness: 130 μm) to 3 times in the MD and to 6.8 times in the TD under a dry stretching condition at a temperature of 155° C., followed by relieving, thermal fixing, and aging.

Detailed specification of the manufactured PET film is shown in Table 1. In the following Table 1, the angle (θ) defined between the external optical axis of the protective film and the normal direction with respect to the in-plane direction of the protective film was 88°, as calculated by the following method. In this method, with a three-dimensional ellipsoid set using an in-plane retardation and an average index of refraction, an angle at which a set of intersections of a plane passing through an origin point and the three-dimensional ellipsoid becomes a circle becomes the internal optical axis, and the path of light traveling through air under Snell's law becomes the external optical axis. The in-plane retardation at a wavelength of 550 nm was measured using an Axoscan (Axometrics Inc.). The average index of refraction at a wavelength of 550 nm was obtained through Cauchy or Sellmeier fitting after measuring indexes of refraction at wavelengths of 486 nm, 589 nm, and 656 nm using an ABBE refractometer.

As a first protective film for polarizers, the manufactured PET film was bonded to one surface of the manufactured polarizer via a bonding agent for polarizing plates. Then, as a second protective film for polarizers, a COP film (Zeonor, thickness: 40 μm, Re: 52 nm at a wavelength of 550 nm, Zeon Co., Ltd.) was bonded to the other surface of the polarizer via a bonding agent for polarizing plates, thereby preparing a polarizing plate.

The polarizing plate has a rectangular shape having a major length direction and a minor length direction, and an absorption axis of the polarizer is the same as the major length direction of the polarizing plate. Assuming that the absorption axis of the polarizer is tilted at 0°, the slow axis of the PET film is tilted at 90°.

Examples 2 and 3

Polarizing plates were manufactured by the same method as in Example 1 except that polyethylene terephthalate films having specifications as listed in Table 1 were manufactured by controlling manufacturing conditions, such as the stretching ratio of the protective film for polarizers and the like.

Comparative Examples 1 and 2

Polarizing plates were manufactured by the same method as in Example 1 except that the first protective film for polarizers was changed as listed in Table 1.

TABLE 1

|  | Example | | | Comparative Example | |
| --- | --- | --- | --- | --- | --- |
|  | 1 | 2 | 3 | 1 | 2 |
| Film thickness (μm) | 49 | 40 | 38 | 50 | 60 |
| nx − ny | 0.13 | 0.14 | 0.13 | 0.06 | 0.07 |
| Slow axis | TD | TD | TD | TD | TD |
| Optical axis angle (θ) (°) | 88 | 85 | 83 | 55 | 68 |
| Angle (°) between slow axis of PET film and TD of PET film | 90 | 90 | 90 | 90 | 90 |
| Re (nm) | 6307 | 5466 | 4823 | 3012 | 3904 |
| Visibility of rainbow mura in application to polarized sunglasses | Not visible | Not visible | Not visible | Extremely visible | Extremely visible |

Generation of rainbow mura was evaluated as to the polarizing plates of Examples and Comparative Examples and results are shown in FIG. 2.

Simulation was performed on an optical display configuration using a liquid crystal panel including liquid crystals aligned in a VA mode, in which each of the polarizing plates manufactured in Examples and Comparative Examples was placed as a viewer-side polarizing plate on a light exit surface of the liquid crystal panel and a triacetylcellulose film/polarizer/COP film were placed as a light source-side polarizing plate on a light incidence surface of the liquid crystal panel. In the viewer-side polarizing plate, the PET film was placed on the light exit surface of the polarizing plate. TECHWIZ (Sanai System Co., Ltd.) was used as simulation software.

As shown in Table 1 and FIG. 2, a simulation result shows that the polarizing plate including the protective film for polarizers according to the present invention prevented rainbow mura from being visible when polarized sunglasses were used. Conversely, it could be seen that the polarizing plates of Comparative Example not employing the protective film for polarizers according to the present invention allowed rainbow mura to be extremely visible when polarized sunglasses were used.

Although some embodiments have been described herein, it should be understood that various modifications, changes, alterations, and equivalent embodiments can be made by those skilled in the art without departing from the spirit and scope of the invention.

The invention claimed is:

1. A protective film for polarizers,
   wherein the protective film is a polyester protective film, has a thickness of about 10 μm to about 50 μm and a refractive index difference (nx−ny) of about 0.01 or more, nx and ny being indexes of refraction of the protective film at a wavelength of about 550 nm in a slow axis direction and a fast axis direction of the protective film, respectively, and is a biaxially stretched film, an internal optical axis of the protective film being an axis thereof which provides no phase retardation, and an external optical axis of the protective film being an axis thereof along which light having traveled along the internal optical axis and emitted from the protective film travels,
   the slow axis direction of the protective film being coincident with a transverse direction (TD) thereof,
   an angle of about 70° to about 90° being defined between the external optical axis of the protective film and a normal direction with respect to an in-plane direction of the protective film.

2. The protective film for polarizers according to claim 1, wherein the protective film has a fast axis tilted at an angle of about 60° to about 120° with respect to the TD of the protective film.

3. The protective film for polarizers according to claim 1, wherein the protective film has an in-plane retardation of about 2,000 nm to about 7,000 nm at a wavelength of about 550 nm.

4. The protective film for polarizers according to claim 1, wherein the polyester protective film comprises a film formed of at least one resin selected from among polyethylene terephthalate, polyethylene naphthalate, polybutylene terephthalate, and polybutylene naphthalate.

5. A polarizing plate comprising: a polarizer; and a protective film for polarizers stacked on a light exit surface of the polarizer, the protective film for polarizers being the protective film for polarizers according to claim 1.

6. The polarizing plate according to claim 5, wherein the polarizing plate has a major length direction and a minor length direction, and an absorption axis of the polarizer is coincident with the major length direction of the polarizing plate.

7. The polarizing plate according to claim 5, wherein, assuming that the absorption axis of the polarizer is placed at an angle of 0°, the protective film for polarizers has a slow axis tilted at an angle of about 60° to about 120° or at an angle of about −120° to about −60° thereto.

8. The polarizing plate according to claim 5, further comprising: an optical film formed on a light incidence surface of the polarizer.

9. An optical display apparatus comprising the polarizing plate according to claim 5.

* * * * *